(12) United States Patent
Farre Guiu et al.

(10) Patent No.: US 11,354,894 B2
(45) Date of Patent: Jun. 7, 2022

(54) AUTOMATED CONTENT VALIDATION AND INFERENTIAL CONTENT ANNOTATION

(71) Applicant: Disney Enterprises, Inc., Burbank, CA (US)

(72) Inventors: Miquel Angel Farre Guiu, Bern (CH); Matthew C. Petrillo, Sandy Hook, CT (US); Monica Alfaro Vendrell, Barcelona (ES); Daniel Fojo, Barcelona (ES); Albert Aparicio Isarn, Barcelona (ES); Francesc Josep Guitart Bravo, Lleida (ES); Jordi Badia Pujol, Madrid (ES); Marc Junyent Martin, Barcelona (ES); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 408 days.

(21) Appl. No.: 16/655,117

(22) Filed: Oct. 16, 2019

(65) Prior Publication Data

US 2021/0117678 A1    Apr. 22, 2021

(51) Int. Cl.
*G06V 20/20* (2022.01)
*G06N 20/00* (2019.01)
*G06K 9/62* (2022.01)
*G06N 5/02* (2006.01)
*G06N 5/04* (2006.01)

(52) U.S. Cl.
CPC .......... *G06V 20/20* (2022.01); *G06K 9/6256* (2013.01); *G06N 5/025* (2013.01); *G06N 5/04* (2013.01); *G06N 20/00* (2019.01)

(58) Field of Classification Search
None
See application file for complete search history.

(56) References Cited

U.S. PATENT DOCUMENTS

| 10,289,963 | B2* | 5/2019 | Chiticariu | G06F 16/35 |
|---|---|---|---|---|
| 2015/0088888 | A1* | 3/2015 | Brennan | G06F 16/38 |
| | | | | 707/737 |
| 2015/0242387 | A1* | 8/2015 | Rachevsky | G06F 16/36 |
| | | | | 704/9 |
| 2016/0365121 | A1* | 12/2016 | DeCaprio | G11B 27/28 |
| 2019/0065911 | A1* | 2/2019 | Lee | G06V 10/40 |

* cited by examiner

*Primary Examiner* — Dov Popovici
(74) *Attorney, Agent, or Firm* — Farjami & Farjami LLP

(57) ABSTRACT

According to one implementation, a system for automating inferential content annotation includes a computing platform having a hardware processor and a system memory storing a software code including a set of rules trained to annotate content inferentially. The hardware processor executes the software code to utilize one or more feature analyzer(s) to apply labels to features detected in the content, access one or more knowledge base(s) to validate at least one of the applied labels, and to obtain, from the knowledge base(s), descriptive data linked to the validated label(s). The software code then infers, using the set of rules, one or more label(s) for the content based on the validated label(s) and the descriptive data, and outputs tags for annotating the content, where the tags include the validated label(s) and the inferred label(s).

20 Claims, 4 Drawing Sheets

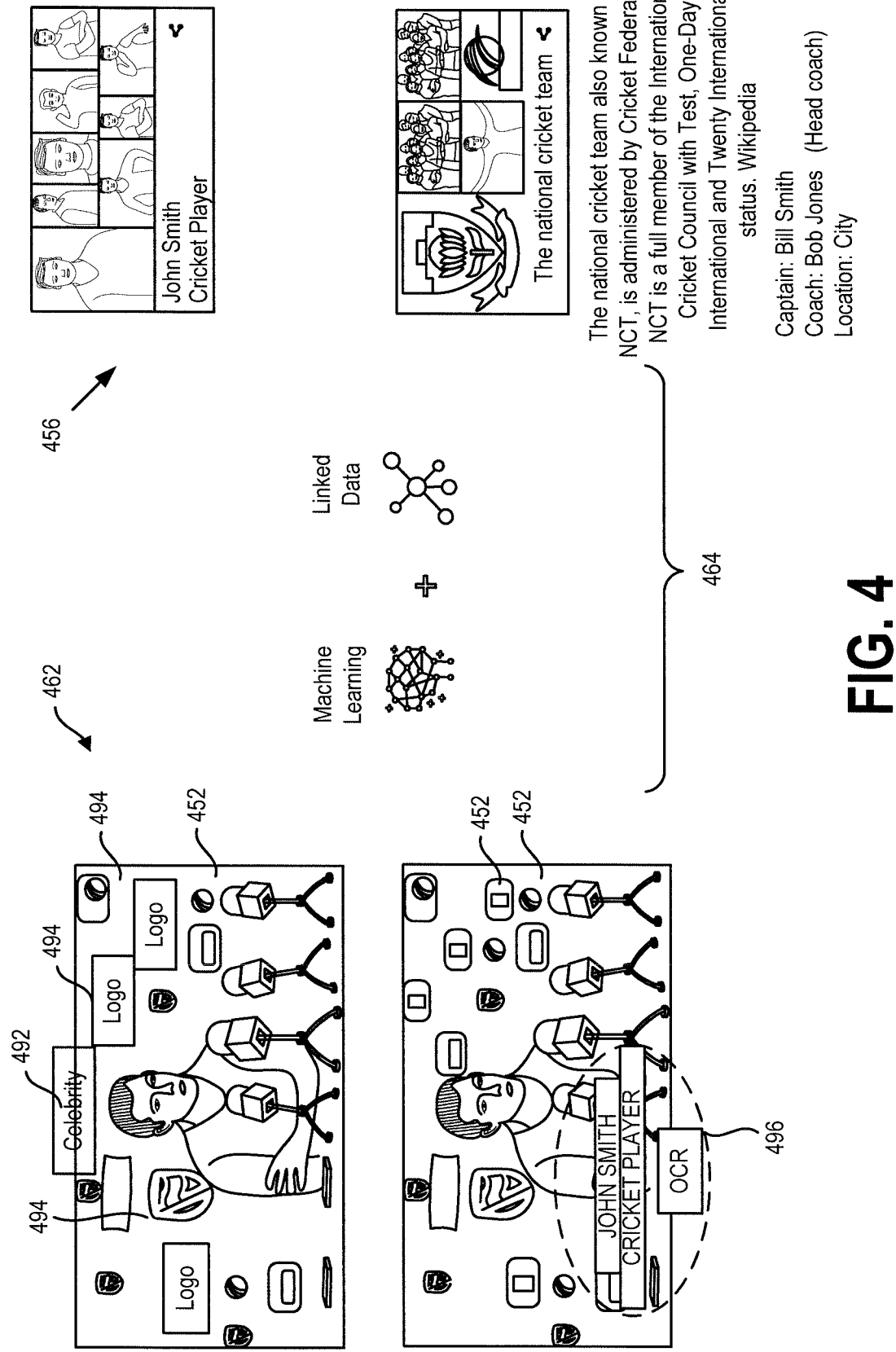

AUTOMATED CONTENT VALIDATION AND INFERENTIAL CONTENT ANNOTATION

BACKGROUND

Audio-visual media, such as video, continues to be a highly popular media format for the enjoyment of entertainment content in the form of movie, television, sports, and gaming content, for example. Due to its popularity with consumers, ever more audio-visual content is being produced and made available for distribution. Consequently, the accuracy and efficiency with which such content can be reviewed, classified, archived, and managed has become increasingly important to its producers, owners, and distributors. Consequently, there is an ongoing need in the art for automated solutions for annotating or "tagging" audio-visual content in order to reduce the time and costs expended on the production and management of that content.

SUMMARY

There are provided systems and methods for automating content validation and inferential content annotation, substantially as shown in and/or described in connection with at least one of the figures, and as set forth more completely in the claims.

BRIEF DESCRIPTION OF THE DRAWINGS

FIG. 4 shows a diagram depicting features detected in audio-visual content and used to inferentially annotate that content, according to one exemplary implementation.

DETAILED DESCRIPTION

Figure 1:
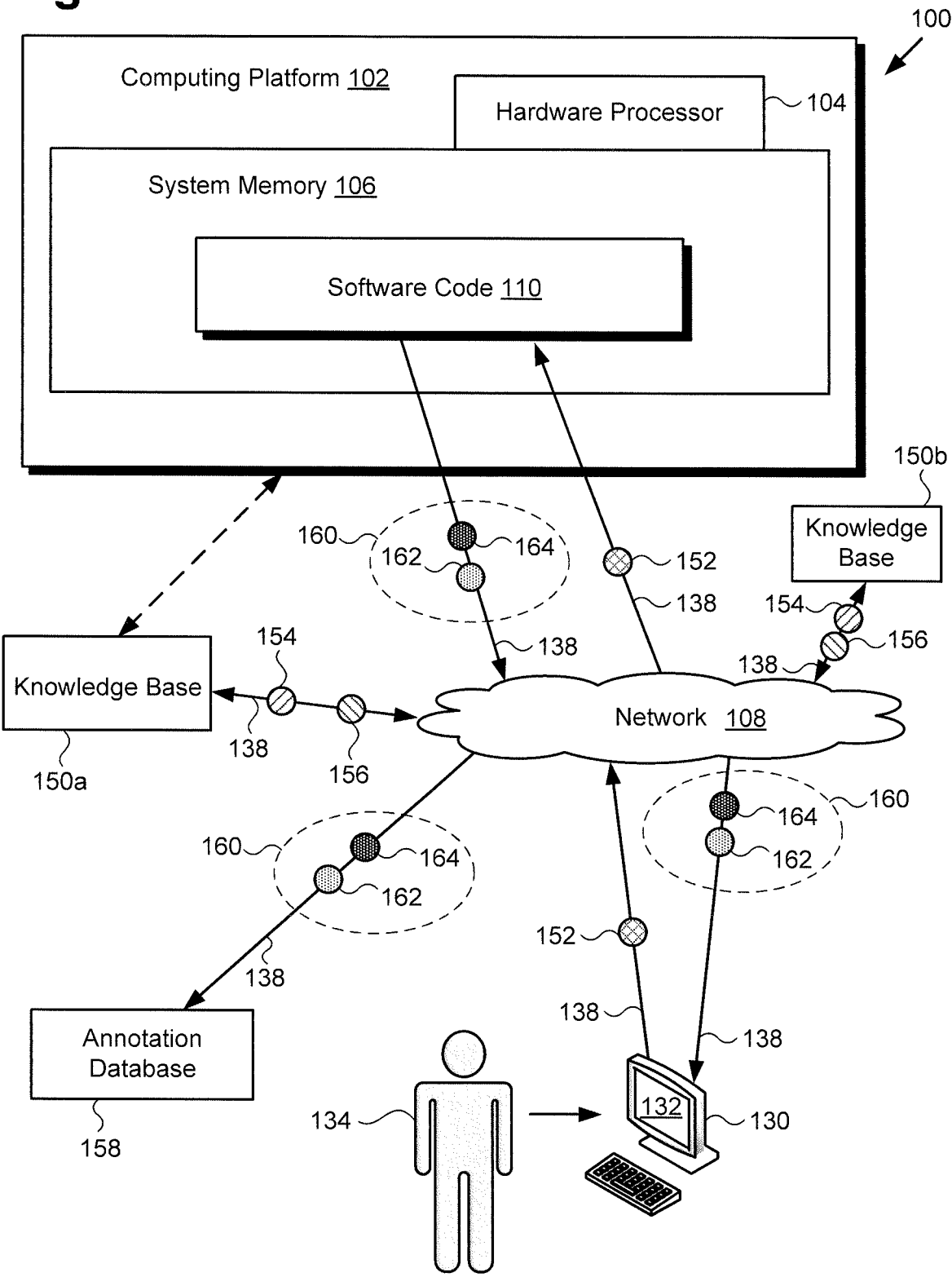
FIG. 1 shows a diagram of an exemplary system for automating content validation and inferential content annotation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As a preliminary matter, it is noted that although in the conventional art, machine learning models can be used effectively to convert data incapable of being queried, such as still images, sounds, text, or video, into structured data, even the most advanced models can make errors when identifying features included in a sample of content. Furthermore, the annotations or tags that such conventional models are capable of applying are typically limited to the classes that have been learned during training of those models.

The present application discloses automated systems and methods for overcoming the limitations in the conventional art described above. According to the present novel and inventive principles, features included in content such as audio-visual content and/or text are initially detected and labeled using multiple machine learning algorithms. Those labels are validated by reference to one or more knowledge bases, and other descriptive data found to be linked to the validated labels in the knowledge base or knowledge bases is harvested. The descriptive data obtained from the knowledge base or knowledge bases, along with the validated labels, is then used to infer additional labels for the content by an artificial neural network or a set of rules trained to annotate content inferentially.

In addition to their use for annotating content, in some implementations, the labels or tags (hereinafter "tags") validated and inferred by the automated systems, according to the automated methods disclosed herein, may also be used to generate datasets for training or retraining a more advanced artificial neural network. For example, those validated and inferred tags may be used to train or retrain a multimodal artificial neural network that learns from substantially all inputs to the system, as well as from substantially all inferences made by the system.

As used in the present application, the terms "automation," "automated", and "automating" refer to systems and processes that do not require the participation of a human user, such as a human editor or annotator. Although, in some implementations, a human editor or annotator may review the tags determined by the automated systems and according to the automated methods described herein, that human involvement is optional. Thus, the methods described in the present application may be performed under the control of hardware processing components of the disclosed automated systems.

In addition, the expression "knowledge base," as used herein, refers to the standard definition of that feature known in the art. Thus, in contrast to a simple database that includes discrete and independent data entries, a knowledge base is a collection of organized information relevant to one or more subjects. In addition to individual entries describing specific aspects of the subject matter covered by a knowledge base, the knowledge base typically includes pointers or other linkages for navigating to related information within the knowledge base. Examples of general subject matter knowledge bases include WIKIDATA®, the GOOGLE® Knowledge Graph, and the ASSOCIATED PRESS®.

Moreover, as defined in the present application, an artificial neural network (hereinafter "ANN"), also known simply as a neural network (NN), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, a feature labeled as an NN or ANN refers to a deep neural network. Various forms of ANNs may be used to make predictions about new data based on past examples or "training data." In various implementations, ANNs may be utilized to perform image processing or natural-language processing.

One significant advantage associated with utilizing one or more knowledge bases is that such use makes it possible to automate the process of validating tags that were generated by automated machine learning algorithms. An additional significant advantage associated with inferring tags is that more tags for annotating content in greater detail can be obtained from the same number of machine learning classifiers than would be the case if inferential tagging were not performed. Furthermore, the inferred tags may be more semantic. For example, where a particular athlete and sports franchise are detected and tagged, additional tags may be inferred and generated relating to a sports league, the particular sport being played, or even a time period, such as a decade or era, when that athlete was active in the sport.

FIG. 1 shows a diagram of an exemplary system for automating inferential content annotation, according to one implementation. As shown in FIG. 1, automated content annotation system 100 includes computing platform 102 having hardware processor 104, and system memory 106 implemented as a non-transitory storage device. According to the present exemplary implementation, system memory 106 stores software code 110.

As further shown in FIG. 1, automated content annotation system 100 is implemented within a use environment including communication network 108 and user system 130 including display 132. User system 130 is configured to be utilized by user 134. In addition, the exemplary use environment shown in FIG. 1 further includes content 152, one or more knowledge bases 150a and 150b (hereinafter "knowledge base(s) 150a/150b"), applied labels 154, descriptive data 156, and annotation database 158. Also shown in FIG. 1 are tags 160 including one or more validated labels 162 (hereinafter "validated label(s) 162") and one or more inferred labels 164 (hereinafter "inferred label(s) 164"), as well as network communication links 138 interactively connecting user system 130, knowledge base(s) 150a/150b, and annotation database 158 with automated content annotation system 100 via communication network 108.

It is noted that although FIG. 1 depicts two knowledge base(s) 150a/150b, that representation is merely exemplary. In other implementations, knowledge base(s) 150a/150b may correspond to a single knowledge base (e.g., only one knowledge base 150a, only one knowledge base 150b, or a single knowledge base including a combination of knowledge base 150a and knowledge base 150b), or to more than two knowledge bases accessible by automated content annotation system 100 over communication network 108, which may be a packet-switched network, for example, such as the Internet. It is further noted that although automated content annotation system 100 may be communicatively coupled to one or more of knowledge base(s) 150a/150b via communication network 108 and network communication links 138, as shown in FIG. 1, in some implementations, one or more of knowledge base(s) 150a/150b may take the form of one or more databases integrated with computing platform 102 and stored in system memory 106.

It is also noted that, although the present application refers to software code 110 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts software code 110 as being stored in its entirety in system memory 106, that representation is also provided merely as an aid to conceptual clarity. More generally, automated content annotation system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within automated content annotation system 100. Thus, it is to be understood that various features of software code 110, such as one or more of the features described below by reference to FIG. 2, may be stored and/or executed using the distributed memory and/or processor resources of automated content annotation system 100.

According to the implementation shown by FIG. 1, user 134 may utilize user system 130 to interact with automated content annotation system 100 over communication network 108. In one such implementation, computing platform 102 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Although user system 130 is shown as a desktop computer in FIG. 1, that representation is also provided merely as an example. More generally, user system 130 may be any suitable mobile or stationary computing device or system that implements data processing capabilities sufficient to provide a user interface, support connections to communication network 108, and implement the functionality ascribed to user system 130 herein. For example, in other implementations, user system 130 may take the form of a laptop computer, tablet computer, or smartphone, for example. User 134 may utilize user system 130 to interact with automated content annotation system 100 to provide content 152 for annotation and/or to receive tags 160 for annotating content 152.

It is noted that, in various implementations, content 152 may be an audio-visual content file or streaming audio-visual content including audio, such as dialog or other speech, video including images and text, and metadata, for example. Moreover, in some use cases, content 152 may simply be text. Exemplary content included in content 152 includes one or more of sports content, television (TV) programming content, movie content, advertising content, or video gaming content.

It is further noted that tags 160, when generated using software code 110, may be stored in system memory 106 and/or may be copied to non-volatile storage. Alternatively, or in addition, as shown in FIG. 1, in some implementations, tags 160 may be sent to annotation database 158 for storage, for example by being transferred via network communication links 138 of communication network 108. As another alternative, or additionally, tags 160 may be transmitted via communication network 108 to user system 130, and in some implementations may be rendered on display 132. Display 132 may take the form of a liquid crystal display (LCD), a light-emitting diode (LED) display, an organic light-emitting diode (OLED) display, or any other suitable display screen that performs a physical transformation of signals to light.

Figure 2:
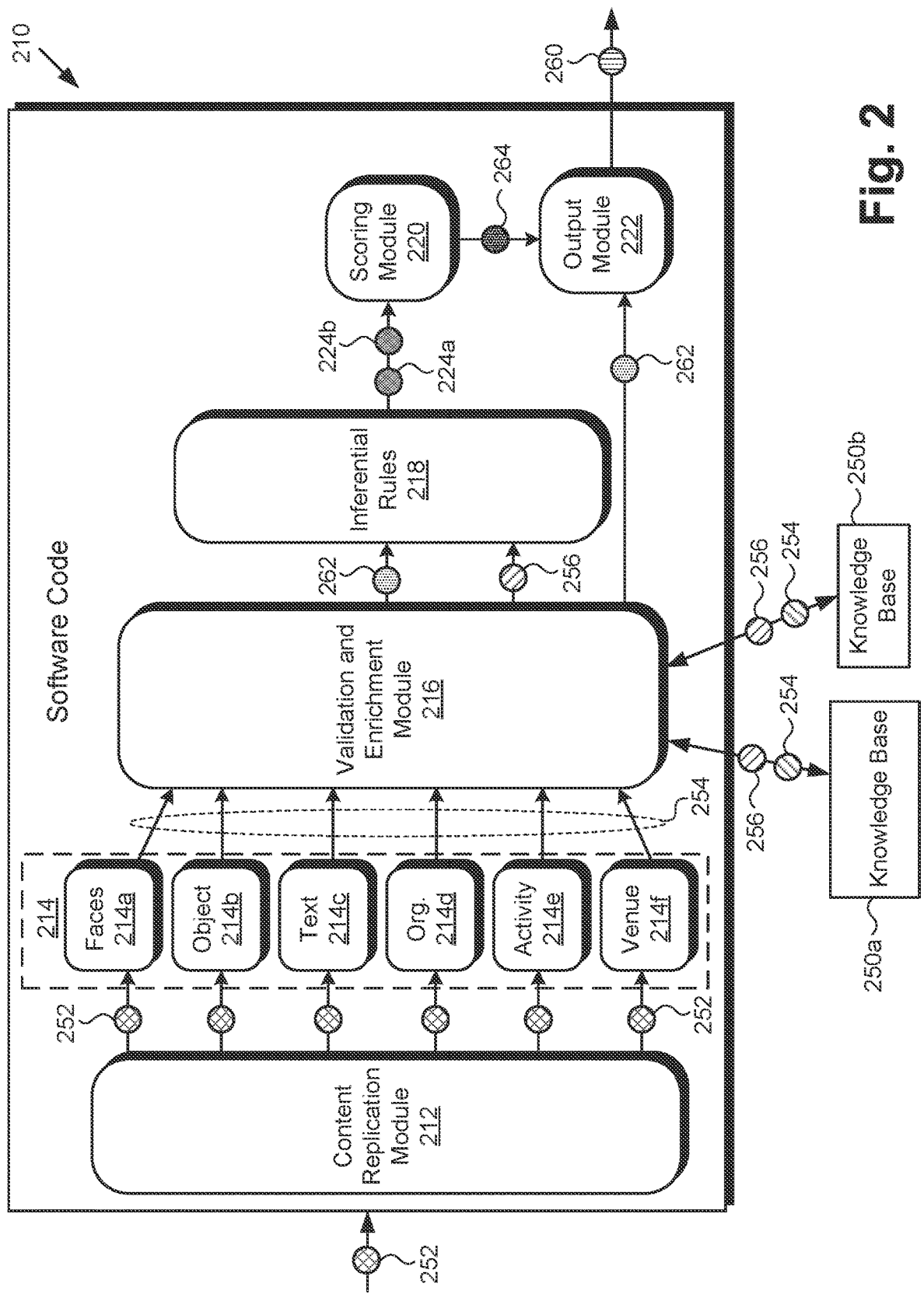
FIG. 2 shows an exemplary diagram of a software code suitable for execution by a hardware processor of the system shown in FIG. 1, according to one implementation.

FIG. 2 shows exemplary software code 210 suitable for execution by hardware processor 104 of computing platform 102, in FIG. 1, according to one implementation. As shown in FIG. 2, software code 210 may include set of rules 218 trained to annotate audio-visual content inferentially (hereinafter "inferential set of rules 218"). In addition, FIG. 2 shows content 252, and tags 260 generated using software code 210 for annotating content 252. Also shown in FIG. 2 are one or more knowledge bases 250a and 250b (hereinafter "knowledge base(s) 250a/250b"), applied labels 254, and descriptive data 256.

As further shown in FIG. 2, in addition to inferential set of rules 218, software code 210 can also include content replication module 212, feature analyzer modules 214, validation and enrichment module 216, relevance scoring module 220, and output module 222 providing tags 260 for annotating content 252 as an output. FIG. 2 further includes one or more validated label(s) 262 (hereinafter "validated label(s) 262"), preliminary inference labels 224a and 224b (hereinafter "preliminary labels 224a and 224b"), and one or more inferred labels 264 (hereinafter "inferred label(s) 264"). Moreover, and as also shown in FIG. 2, feature analyzer modules 214 may include facial recognition module 214a, object recognition module 214b, text analysis module 214c, brand, logo, or organization recognition module 214d (hereinafter "organization recognition module 214d"), activity recognition module 214e, venue recognition module 214f, or any combination thereof.

It is noted that the specific modules shown to be included among feature analyzer modules 214 are merely exemplary, and in other implementations, feature analyzer modules 214 may include more, or fewer, modules than facial recognition module 214a, object recognition module 214b, text analysis module 214c, organization recognition module 214d, activity recognition module 214e, and venue recognition module 214f (e.g., any one of modules 214a-214f may be omitted or more than one of a specific module of modules 214a-214f may be included). Moreover, in other implementations, feature analyzer modules 214 may include one or more modules other than, one or more of facial recognition module 214a, object recognition module 214b, text analysis module 214c, organization recognition module 214d, activity recognition module 214e, and venue recognition module 214f.

For example, in some implementations, feature analyzer modules 214 may include a named entity recognition module, and/or a topic recognition module including an ANN trained to identify specific text properties, such as distinguishing between an interview and a news digest, for example. It is further noted that, in some implementations, it may be advantageous or desirable to implement inferential set of rules 218 with an ANN trained to annotate content 252 inferentially. Thus, in those implementations, the feature identified by reference number 218 in FIG. 2 may be labeled as "inferential ANN 218."

Content 252, tags 260 including validated label(s) 262 and inferred label(s) 264, knowledge base(s) 250a/250b, applied labels 254, and descriptive data 256 correspond respectively in general to content 152, tags 160 including validated label(s) 162 and inferred label(s) 164, knowledge base(s) 150a/150b, applied labels 154, and descriptive data 156, in FIG. 1. As a result, content 252, tags 260, knowledge base(s) 250a/250b, applied labels 254, and descriptive data 256 may share any of the characteristics attributed to respective content 152, tags 160, knowledge base(s) 150a/150b, applied labels 154, and descriptive data 156 by the present disclosure, and vice versa. That is to say, like content 152, content 252 may include one or more of sports content, TV programming content, movie content, advertising content, or video gaming content. Moreover, like knowledge base(s) 150a/150b, in some implementations, one or more of knowledge base(s) 250a/250b may be stored in system memory 106 of automated content annotation system 100, while in some implementations, one or more of knowledge base(s) 250a/250b may be accessible to automated content annotation system 100 via communication network 108, which may be the Internet, for example.

Software code 210 corresponds in general to software code 110, and those corresponding features may share any of the characteristics attributed to either corresponding feature by the present disclosure. Thus, like software code 210, software code 110 may include inferential set of rules 218, as well as features corresponding respectively to content replication module 212, feature analyzer modules 214, validation and enrichment module 216, relevance scoring module 220, and output module 222.

Figure 3:
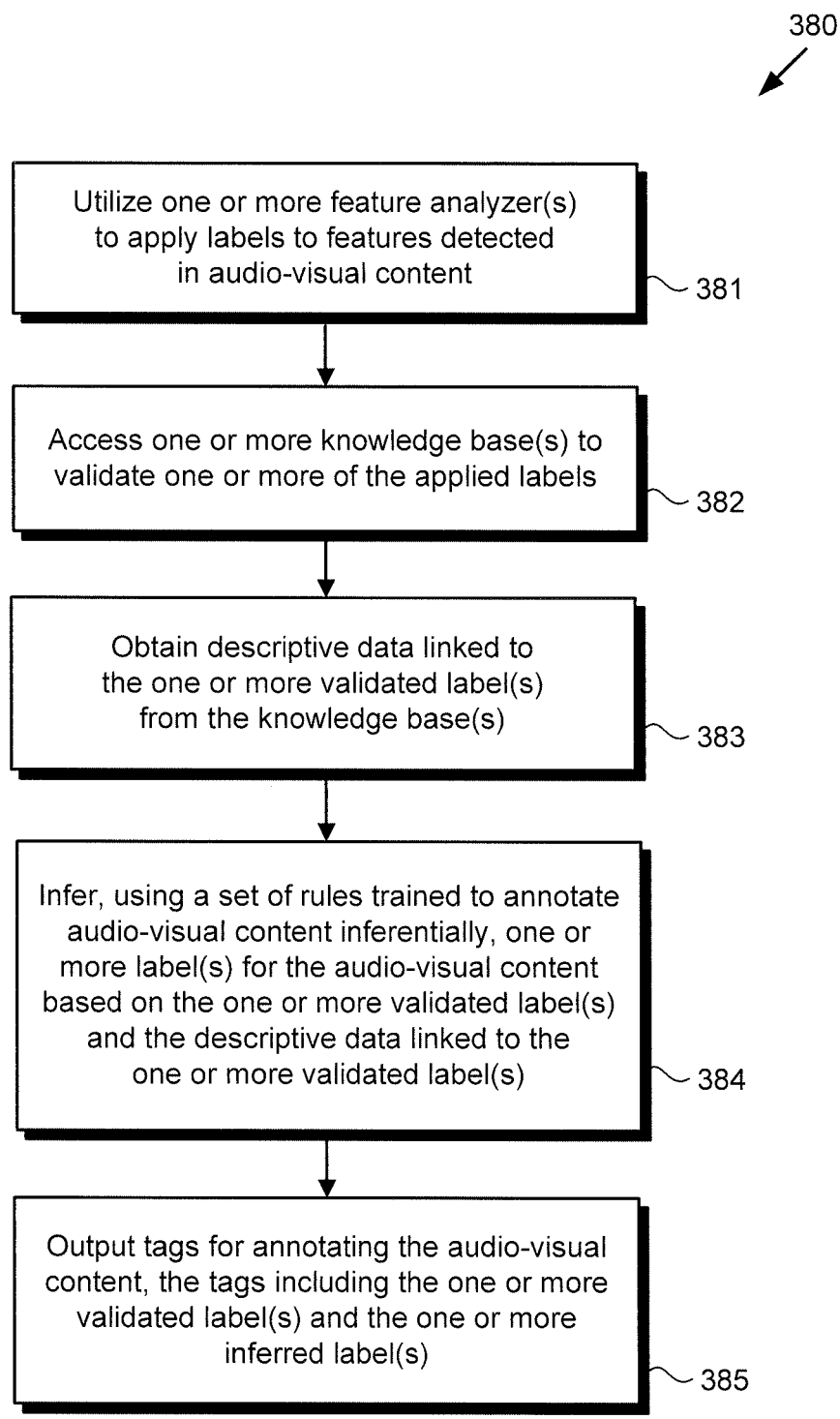
FIG. 3 shows a flowchart presenting an exemplary method for automating content validation and inferential content annotation, according to one implementation.

The functionality of software code 110/210 and inferential set of rules 218 will be further described by reference to FIG. 3 in combination with FIGS. 1 and 2. FIG. 3 shows flowchart 380 presenting an exemplary method for automating inferential content annotation, according to one implementation. With respect to the method outlined in FIG. 3, it is noted that certain details and features have been left out of flowchart 380 in order not to obscure the discussion of the inventive features in the present application.

Referring to FIG. 3 in combination with FIGS. 1 and 2, flowchart 380 begins with utilizing one or more of feature analyzer modules 214 to apply labels, i.e., applied labels 154/254 to features detected in audio visual content 152/252 (action 381). By way of an exemplary use case, user 134 may utilize user system 130 to interact with automated content annotation system 100 in order to produce tags 160/260 for annotating content 152/252. As shown by FIG. 1, in one implementation, user 134 may do so by transmitting content 152/252 from user system 130 to automated content annotation system 100 via communication network 108 and network communication links 138. Alternatively, content 152/252 may be received from a third party source (not shown in FIG. 1), or may be stored in system memory 106.

As noted above, content 152/252 may be text and/or a content file or streaming content including audio, such as dialog or other speech, and video including images and text, of one or more of sports content, TV programming content, movie content, advertising content, or video gaming content. In some implementations, feature analyzer modules 214 may be utilized in parallel to detect and label different classes of features contained in content 152/252 substantially concurrently. In those implementations, content 152/252 may be received by content replication module 212 of software code 110/210, and may be replicated to provide a copy of content 152/252 to two or more of feature analyzer modules 214 substantially concurrently. Action 381 may be performed by software code 110/210, and executed by hardware processor 104.

Facial recognition module 214a may be utilized by software code 110/210 to identify and label persons depicted in content 152/252. For example, facial recognition module 214a may output applied labels 154/254 identifying one or more actors, characters, athletes, or celebrities appearing in content 152/252.

Object recognition module 214b may be utilized by software code 110/210 to identify and label objects depicted in content 152/252. For example, object recognition module 214b may output applied labels 154/254 identifying vehicles, clothing, structures, or sports gear appearing in content 152/252.

Text analysis module 214c may be utilized by software code 110/210 to interpret text or speech included in content 152/252. For example, text analysis module 214c may be configured to convert dialog, such as a conversation, or other speech included in content 152/252 into text, and to analyze the text to identify the subject matter of the speech using applied labels 154/254 based on trained deep learning. Alternatively, or in addition, text analysis module 214c may employ optical character recognition (OCR) to output applied labels 154/254 interpreting signage or text overlays appearing in content 152/252.

Organization recognition module 214d may be utilized by software code 110/210 to identify logos, brands, or organizational entities appearing in content 152/252. For example, where content 152/252 includes sports content, organization recognition module 214d may output applied labels 154/254 identifying sporting federation or team logos appearing in the content 152/252.

Activity recognition module 214e may be utilized by software code 110/210 to identify and label action depicted in content 152/252. For example, activity recognition module 214e may output applied labels 154/254 identifying interactions, such as handshakes, hugs, or other physical manifestations of affection or conflict, amongst characters or persons appearing in content 152/252.

Venue recognition module 214f may be utilized by software code 110/210 to identify and label locations depicted in content 152/252. For example, venue recognition module 214f may output applied labels 154/254 identifying iconic locations, such as the Eiffel Tower or Empire State Building, for example, or the stadium or arena in which a sporting event is being played.

It is noted that, in some implementations, all of feature analyzer modules 214 may be used to detect and label features in audio-visual content in parallel and substantially concurrently. However, in some implementations it may be advantageous or desirable to use some, but not all of feature analyzer modules 214 to generate applied labels 154/254 for content 152/252. For example, where audio-visual content includes movie or TV programming content, facial recognition module 214a and text analysis module 214c may be considered to be very important for annotating content 152/252, but organization recognition module 214d may be considered to be less important. In that instance, use of organization recognition module 214d may be omitted during action 381.

Flowchart 380 continues with accessing knowledge base (s) 150a/150b/250a/250b to validate one or more of applied labels 154/254, thereby identifying validated label(s) 262 (action 382). As noted above, examples of knowledge base (s) 150a/150b/250a/250b may include WIKIDATA®, the GOOGLE® Knowledge Graph, and the ASSOCIATED PRESS®, to name a few.

Where one of applied labels 154/254 identifies a person appearing in content 152/252 as an actor, athlete, or celebrity, action 382 may correspond to searching knowledge base(s) 150a/150b/250a/250b to confirm that the identified actor, athlete, or celebrity is a real person. Moreover, where one of applied labels 154/254 identifies a sport engaged in by the identified actor, athlete, or celebrity, action 382 may correspond to searching knowledge base(s) 150a/150b/ 250a/250b to determine whether the identified actor, athlete, or celebrity has a connection to the sport according to one or more entries in knowledge base(s) 150a/150b/250a/250b.

It is noted that the exemplary use case described above in which a person identified in content 152/252 is confirmed to be a real person is merely provided in the interests of conceptual clarity. In various implementations, applied labels 154/254 may identify a fictional character, such as an animated character, superhero, or dramatis personae, for example. In those implementations, action 382 may correspond to confirming that the identified fictional character has an acknowledged persona.

Applied labels 154/254 that are not confirmed to correspond to the features to which they have been applied based on entries in knowledge base(s) 150a/150b/250a/250b may be rejected, unless their probability and/or frequency of appearance determined by one of feature analyzer modules 214 are high. For example, if facial recognition module 214a provides one of applied labels 154/254 identifying "Actor A" with a single appearance in content 152/252, that label will typically be rejected if a corresponding entry for "Actor A" is not found in knowledge base(s) 150a/150b/250a/250b. However, if facial recognition module 214a provides applied label 154/254 identifying "Actor A" with a high probability and/or frequency of appearance, that label may be considered validated and may become one of validated label(s) 262 even if a corresponding entry is not found in knowledge base(s) 150a/150b/250a/250b.

By way of example, high probability may be considered a confidence level of greater than 80% as determined by the feature analyzer module applying the label, on a scale where 100% equals absolute certainty. An exemplary high frequency of appearance, also known as "high saliency," may in one implementation be defined as making more than four distinct appearances on content 152/252, or appearing in more than 30% of the video content included in content 152/252.

As shown in FIG. 2, validation and enrichment module 216 of software code 110/210 may receive applied labels 154/254 from one or more of feature analyzer modules 214. In addition, in some implementations, validation and enrichment module 216 may receive additional inputs from other labeling or classifications sources, such a trained ANNs, other rule based classification engines, or even manual inputs. Software code 110/210, when executed by hardware processor 104, may use validation and enrichment module 216 to access one or more of knowledge base(s) 150a/150b/ 250a/250b to confirm the accuracy of one or more of applied labels 154/254. Those of applied labels 154/254 confirmed to be accurate are then identified as validated label(s) 162/262 by validation and enrichment module 216.

It is noted that in some use cases, a label identifying a person by name may correspond to a name shared by several different real people. For example, "Name A" may correspond to an athlete and a pop singer having entries in knowledge base(s) 150a/150b/250a/250b. In those instances, the knowledge base entry that most closely agrees with other labels applied to the person may be relied upon. If the person identified as "Name A" also has labels applied that are associated with sport but not associated with pop music, the label identifying the persons as "athlete Name A" may be considered validated.

Flowchart 380 continues with obtaining, from one or more of knowledge base(s) 150a/150b/250a/250b, descriptive data 156/256 linked to validated label(s) 162/262 in the knowledge base(s) 150a/150b/250a/250b (action 383). Action 383 enriches the information regarding validated label(s) 162/262 held by automated content annotation system 100. For each of validated label(s) 162/262, its characteristics and associations can be obtained from one or more of knowledge base(s) 150a/150b/250a/250b. In some implementations, the type of descriptive data 156/256 sought and obtained in action 383 may depend on the nature of content 152/252, and may be identifiable from a human curated lookup table accessible to software code 110/210. For example, if content 152/252 includes sports content, action 383 may include descriptive data 156/256 related to a sports league, a team, a sports club, and/or a particular athlete, for example. It is noted that descriptive data 156/256 may include images and text.

In some implementations, validated label(s) 162/262 may be grouped by the properties they share, and additional validation may be performed based on the size of the groups. For instance, presumptively validated label(s) 162/262 included in large groups may be accepted as confirmed even if their probabilities or appearances are not high, due to the group effect. By contrast, presumptively validated label(s) 162/262 that are included in small groups, or not included in a group at all, may be rejected or require additional validation unless the feature analyzer 214 that applied those label(s) identified the label(s) to be reliable.

Action 383 may be performed by software code 110/210, executed by hardware processor 104, and using validation and enrichment module 216. In some implementations, descriptive data 156/256 may be obtained from one or more of knowledge base(s) 150a/150b/250a/250b stored in system memory. Alternatively, or in addition, descriptive data 156/256 may be obtained from one or more of knowledge base(s) 150a/150b/250a/250b via communication network 108, which may be the Internet for example. It is noted that descriptive data 156/256 may be obtained in action 383 from the same one or more, or a different one or more of knowledge base(s) 150a/150b/250a/250b than the knowledge base(s) 150a/150b/250a/250b accessed in action 382. That is to say, in one implementation, a first knowledge base of knowledge base(s) 150a/150b/250a/250b, i.e., knowledge base 150a/250a, may be accessed to confirm the accuracy of applied labels 154/254 in action 382, while descriptive data 156/256 may be obtained from that same knowledge base and/or from a second knowledge base of knowledge base(s) 150a/150b/250a/250b, i.e., knowledge base 150b/250b.

Flowchart 380 continues with inferring, using inferential set of rules 218, one or more labels for content 152/252 based on validated label(s) 162/262 and descriptive data 156/256 linked to validated label(s) 162/262 (action 384). Action 384 may be performed by software code 110/210, executed by hardware processor 104, and using inferential set of rules 218.

As noted above, in some implementations, validated label(s) 162/262 may be grouped by the properties they share. In those implementations, action 384 may include taking into account validated label(s) 162/262 (e.g. label C) not included in a group (e.g., group A) due to the lack of common properties in knowledge base(s) 150a/150b/250a/250b, and determining the probability that group A shares "property X" if label C has been applied to a feature of content 152/252.

For example, assume that in content 152/252 each instance in which the sports drink "brand G" is detected, many other features detected concurrently with sports drink "brand G" share the property "basketball," although sports drink "brand G" does not share that property. If in a subsequent very short clip of video, famous basketball "athlete Y" and sports drink "brand G" are detected and validated, the additional label "basketball" may be inferred.

FIG. 4 shows a diagram depicting features detected in audio-visual content and used to inferentially annotate that content, according to one exemplary implementation. FIG. 4 shows content 452 including features labeled as celebrity athlete 492, sports logo 494, and text 496. As shown in FIG. 4, the labels applied to celebrity athlete 492, sports logo 494, and text 496 are validated labels 462. Also shown in FIG. 4 is descriptive data 456 and inferred label 464.

It is noted that content 452, validated labels 462, descriptive data 456, and inferred label 464 correspond respectively in general to content 152/252, validated label(s) 162/262, descriptive data 156/256, and inferred label(s) 164/264 in FIGS. 1 and 2. Thus, content 452, validated labels 462, descriptive data 456, and inferred label 464 may share any of the characteristics attributed to respective content 152/252, validated label(s) 162/262, descriptive data 156/256, and inferred label(s) 164/264 by the present disclosure, and vice versa.

According to the example shown in FIG. 4, content 152/252/452 includes features detected and labeled by facial recognition module 214a as celebrity athlete 492, features detected and labeled by organization recognition module 214d as sports logo 494, and text 496 detected and interpreted by text analysis module 214c. In addition to text 496, text analysis module 214c may interpret the speech uttered by celebrity athlete 492 as being about a specific sport, i.e., cricket in the example shown by FIG. 4.

Once validated, validated label(s) 162/262/462 for celebrity athlete 492, sports logo 494, and text 496 are used to obtain descriptive data 156/256/456 linked to one or more of celebrity athlete 492, sports logo 494, and text 496 in knowledge base(s) 150a/150b/250a/250b. Based on validated label(s) 162/262/462 and descriptive data 156/256/456 linked to one or more of validated label(s) 162/262/462, inferential set of rules 218 may be used to infer the inferred label(s) 164/264/464 "cricket" for content 152/252/452 despite the fact no feature labeled "cricket" is detected in content 152/252/452.

Flowchart 380 can continue and conclude with outputting tags 160/260 for annotating content 152/252/452, tags 160/260 including validated label(s) 162/262/462 and inferred label(s) 164/264/464 (action 385). In some implementations, software code 110/210 may determine that some tags that are relevant to content 152/252/452 may not be relevant for user 134 and are therefore not provided as outputs in action 385. An example of such tags may be commercial branding, which may be detected, recognized, and validated, but may omitted from tags 160/260 for annotating content 152/252/452.

As shown in FIG. 2, tags 160/260 may be output by software code 110/210, executed by hardware processor 104, and using output module 222. As noted above, in some use cases, tags 160/260 may be output by software code 110/210 for storage in system memory 106 and/or may be copied to non-volatile storage. Alternatively, or in addition, in some use cases, tags 160/260 may be output to annotation database 158 for storage, for example by being transmitted via network communication links 138 of communication network 108.

As another alternative, or additionally, and as also noted above, tags 160/260 may be transmitted via communication network 108 to user system 130 including display 132. Although not included in flowchart 380, in some implementations in which tags 160/260 are output to user system 130, the present method can include rendering tags 160/260 on display 132 of user system 130. As noted above, display 132 may be implemented as an LCD, LED display, or an OLED display, for example.

It is noted that, in some implementations, user system 130 including display 132 may be integrated with automated content annotation system 100 such that display 132 may be controlled by hardware processor 104 of computing platform 102. In other implementations, as noted above, software code 110/210 including inferential set of rules 218 may be stored on a computer-readable non-transitory medium, and may be accessible to the hardware processing resources of user system 130. In those implementations, the rendering of tags 160/260 on display 132 may be performed by software code 110/210, executed either by hardware processor 104 of computing platform 102, or by a hardware processor of user system 130.

In some implementations, inferred label(s) 164/264/464 may be a subset of preliminary labels 224a and 224b generated inferentially by inferential set of rules 218. It is noted that although FIG. 2 depicts two preliminary labels 224a and 224b, more generally, preliminary labels 224a and 224b may correspond to more, or many more, than two preliminary labels.

In implementations in which inferred label(s) 164/264/464 are a subset of preliminary labels 224a and 224b, it may be advantageous or desirable to evaluate the relevance of preliminary labels 224a and 224b to content 152/252/452 before finally identifying inferred label(s) 164/264/464 for inclusion in tags 160/260. As a result, in some implementations, hardware processor 104 may execute software code 110/210 to utilize relevance scoring module 220 to determine a relevance score for each of preliminary labels 224a and 224b, and to identify inferred label(s) 164/264/464 for content 152/252/452 based on the relevance score. In one implementation, inferred label(s) 164/264/464 may be the one of preliminary labels 224a and 224b having the highest relevance score, for example. Alternatively, in another exemplary implementation, inferred label(s) 164/264/464 may include each of preliminary labels 224a and 224b having a relevance score greater than a predetermined threshold.

Referring back to FIG. 2, it is noted that although the implementations described by reference to that figure above characterize some or all of feature analyzer modules 214 to be utilized in parallel, and substantially concurrently, those implementations are merely exemplary. In some use cases, it may be advantageous or desirable to use less than all of feature analyzer modules 214, and to use them sequentially rather and concurrently. That is to say, if the results of utilizing a few of feature analyzer modules 214 are highly reliable (i.e., high probabilities and high frequency of appearance), some of feature analyzer modules 214 would not need to run, thereby advantageously saving time and resources thanks to inference. For example, if for content 152/252/452 including sports content, validated label(s) 162/262/462 resulting from use of facial recognition module 214a, object recognition module 214b, text analysis module 214c, and organization recognition module 214d create a group that according to knowledge base(s) 150a/150b/250a/250b share the same sport as property, use of activity recognition module 214e and venue recognition module 214f may not be required or desired.

Thus, the present application discloses systems and methods for automating inferential annotation of audio-visual content that overcomes the drawbacks and deficiencies in the conventional art. As disclosed above, features included in audio-visual content are initially detected and labeled using multiple machine learning algorithms. Those labels are validated by reference to one or more knowledge bases, and other descriptive data linked to the validated labels in the knowledge base(s) harvested. The descriptive data obtained from the knowledge base(s), along with the validated labels, is then advantageously used to infer additional labels for the audio-visual content by an ANN trained to annotate audio-visual content inferentially.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated content annotation system comprising:
   a computing platform including a hardware processor and a system memory;
   a software code stored in the system memory, the software code including a set of rules trained to annotate content inferentially;
   the hardware processor configured to execute the software code to:
   utilize at least one feature analyzer to apply a plurality of labels to features detected in the content;
   access at least one knowledge base to validate at least one of the applied plurality of labels;
   obtain, from the at least one knowledge base, a descriptive data linked to the at least one validated label in the at least one knowledge base;
   infer, using the set of rules, at least one label for the content based on the at least one validated label and the descriptive data linked to the at least one validated label; and
   output tags for annotating the content, the tags including the at least one validated label and the inferred at least one label.

2. The automated content annotation system of claim 1, wherein the inferred at least one label is a subset of a plurality of preliminary labels generated inferentially using the set of rules for the content, and wherein the hardware processor is further configured to execute the software code to:
   determine a relevance score for each of the plurality of preliminary labels; and
   identify the inferred at least one label for the content based on the relevance score.

3. The automated content annotation system of claim 2, wherein the inferred at least one label is one of the plurality of preliminary labels having a highest relevance score.

4. The automated content annotation system of claim 2, wherein the inferred at least one label includes each of the plurality of preliminary labels having a respective relevance score greater than a predetermined threshold.

5. The automated content annotation system of claim 1, wherein the at least one feature analyzer includes at least one of a facial recognition module, an object recognition module, or an activity recognition module.

6. The automated content annotation system of claim 1, wherein the at least one feature analyzer includes a text analysis module configured to analyze text and speech included in the content.

7. The automated content annotation system of claim 1, wherein the at least one feature analyzer includes at least one of an organization recognition module or a venue recognition module.

8. The automated content annotation system of claim 1, wherein the at least one knowledge base is stored in the system memory.

9. The automated content annotation system of claim 1, wherein the descriptive data is obtained from the at least one knowledge base via a packet-switched network.

10. The automated content annotation system of claim 1, wherein the content comprises at least one of sports content, television programming content, movie content, advertising content, or video gaming content.

11. A method for use by an automated content annotation system including a computing platform having a hardware processor and a system memory storing a software code including a set of rules for trained to annotate content inferentially, the method comprising:
   utilizing at least one feature analyzer, by the software code executed by the hardware processor, to apply a plurality of labels to features detected in the content;
   accessing at least one knowledge base, by the software code executed by the hardware processor, to validate at least one of the applied plurality of labels;
   obtaining, by the software code executed by the hardware processor, from the at least one knowledge base, a descriptive data linked to the at least one validated label in the at least one knowledge base;
   inferring, by the software code executed by the hardware processor and using the set of rules, at least one label for the content based on the at least one validated label and the descriptive data linked to the at least one validated label; and
   outputting, by the software code executed by the hardware processor, tags for annotating the content, the tags including the at least one validated label and the inferred at least one label.

12. The method of claim 11, wherein the inferred at least one label is a subset of a plurality of preliminary labels generated inferentially using the set of rules for the content, the method further comprising:
   determining, by the software code executed by the hardware processor, a relevance score for each of the plurality of preliminary labels; and
   identifying the inferred at least one label for the content, by the software code executed by the hardware processor, based on the relevance score.

13. The method of claim 12, wherein the inferred at least one label is one of the plurality of preliminary labels having a highest relevance score.

14. The method of claim 12, wherein the inferred at least one label includes each of the plurality of preliminary labels having a respective relevance score greater than a predetermined threshold.

15. The method of claim 11, wherein the at least one feature analyzer includes at least one of a facial recognition module, an object recognition module, or an activity recognition module.

16. The method of claim 11, wherein the at least one feature analyzer includes a text analysis module configured to analyze text and speech included in the content.

17. The method of claim 11, wherein the at least one feature analyzer includes at least one of an organization recognition module or a venue recognition module.

18. The method of claim 11, wherein the at least one knowledge base is stored in the system memory.

19. The method of claim 11, wherein the descriptive data is obtained from the at least one knowledge base via a packet-switched network.

20. The method of claim 11, wherein the content comprises at least one of sports content, television programming content, movie content, advertising content, or video gaming content.

* * * * *